United States Patent [19]

Tsuchitani et al.

[11] Patent Number: 4,896,930
[45] Date of Patent: Jan. 30, 1990

[54] OPTICAL FUNCTIONAL DEVICE OF AN OPTICAL WAVEGUIDE TYPE

[75] Inventors: Shigeki Tsuchitani, Mito; Kazuji Yamada, Hitachi, both of Japan

[73] Assignee: Hitachi, Ltd., Tokyo, Japan

[21] Appl. No.: 158,706

[22] Filed: Feb. 22, 1988

[30] Foreign Application Priority Data

Mar. 19, 1987 [JP] Japan .................. 62-62555

[51] Int. Cl.⁴ .............................. G12B 6/10
[52] U.S. Cl. ...................... 350/96.12; 350/96.34
[58] Field of Search ............... 350/96.11, 96.12, 96.13, 350/96.34, 96.15, 96.29; 307/425–430

[56] References Cited

U.S. PATENT DOCUMENTS

| | | | |
|---|---|---|---|
| 4,199,698 | 4/1980 | Bethea et al. | 307/425 |
| 4,639,074 | 1/1987 | Murphy | 350/96.15 |
| 4,701,008 | 10/1987 | Richard et al. | 350/96.12 |
| 4,725,114 | 2/1988 | Murphy | 350/96.12 |

FOREIGN PATENT DOCUMENTS

| | | | |
|---|---|---|---|
| 0151065 | 8/1985 | European Pat. Off. | 350/96.15 |
| 0065910 | 5/1980 | Japan | 350/96.12 |
| 0105205 | 6/1983 | Japan | 350/96.15 |
| 0178310 | 10/1983 | Japan | 350/96.15 |
| 0014222 | 1/1985 | Japan | 350/96.12 |
| 0250334 | 12/1985 | Japan | 350/96.12 |
| 62-3230 | 9/1987 | Japan . | |
| 1602847 | 11/1981 | United Kingdom | 350/96.12 |

OTHER PUBLICATIONS

Tomaru et al., "Organic Crystals-Waveguides"; 06/01/1984; Optics Communications; vol. 50, No. 3; pp. 154–156.

Primary Examiner—Frank Gonzalez
Attorney, Agent, or Firm—Antonelli, Terry & Wands

[57] ABSTRACT

The present invention relates to an optical functional device of an optical waveguide type, particularly to an optical waveguide type with an organic nonlinear optical material suitable for the use in the fields of optical communication or optical information processing. In other words, the present invention provides an optical functional device having an organic nonlinear optical material as an optical waveguide embedded into the surface of a substrate and being an organic nonlinear optical material charged into a hollow part which is composed of a channel as a slit provided on the surface of said substrate and a further substrate for covering the upper part of the channel.

27 Claims, 6 Drawing Sheets

FIG. 8A FORMATION OF ELECTRODES AND A CIRCUIT
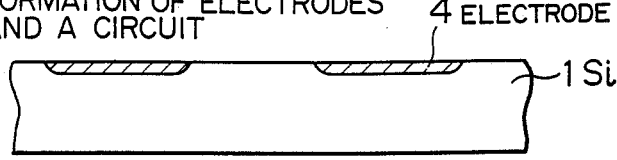
FIG. 8B SiO2 CVD
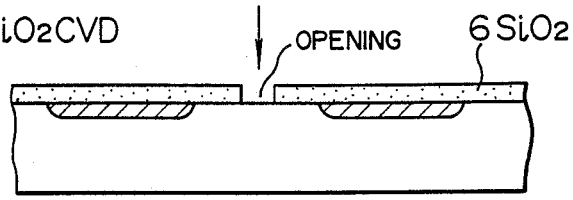
FIG. 8C Si ETCHING
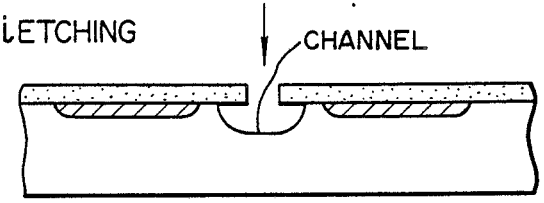
FIG. 8D THERMAL OXIDATION
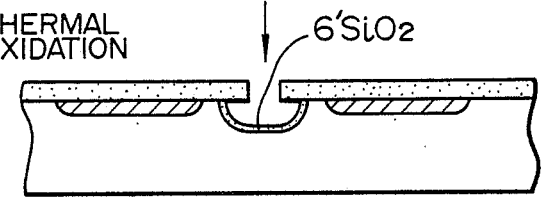
FIG. 8E COATING AND CALCINING
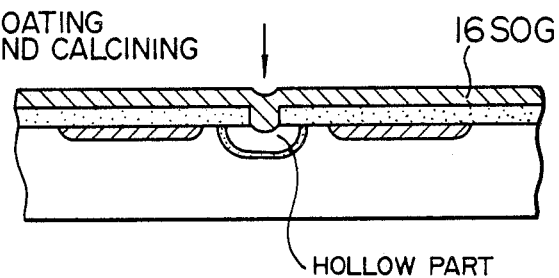

OPTICAL FUNCTIONAL DEVICE OF AN OPTICAL WAVEGUIDE TYPE

BACKGROUND OF THE INVENTION

1. Field of the Invention

The present invention relates to an optical functional device of a waveguide type, in particular the one which has an organic nonlinear optical material as an element and is suitable for use in the field of optical communication or optical information treatment.

2. Description of the Prior Art

It has recently been recognized from experimental and theoretical researches that organic compounds having nonlocalized $\pi$ electrons exhibit an extremely large nonlinear optical response. In particular, for second order nonlinear optical constants, many compounds have been found at the molecular level which have a nonlinear optical constant of two figure larger than those of known inorganic crystals such as $LiNbO_3$ or the like, and researches have been successively conducted looking into the crystallization of these compounds.

These organic nonlinear optical crystals are considered very hopeful as new materials in the application fields such as optical modulation, optical frequency modulation, optical bistability, phase conjugate optics or the like, and thus many methods for incorporating the crystals into a device have hitherto been proposed. There has recently been examined also a unit mode waveguide as well as conventional multimode waveguides as the optical functional device of a waveguide type. However, all of these proposals are only for the formation of multimode waveguides as described in Optical Communications, 50, 154 (1984) or ACS Symposium series 233, 153 (1983), in which a channel having a width of about 100 $\mu m$ is provided on a substrate and filled with a molten nonlinear optical material, or the molten material are charged into a hollow optical fiber having an internal diameter of 2-10 $\mu m$ by capillarity.

On the other hand, optical functional devices of a waveguide type are in many cases constituted of a unit mode waveguide having a narrow core width and electrodes for controlling waveguided light by an electrooptic effect, acoustooptic effect or the like.

However, amongst the aforementioned conventional techniques regarding the formation of a unit mode waveguide, the former method in which a channel is provided and filled with a molten nonlinear optical material has a problem in that it is very difficult to fill the channel having a prescribed depth and width with the molten material because of the channel having a narrow diameter of several micrometers.

The latter method among the aforementioned conventional techniques in which a molten nonlinear optical material is charged into a hollow optical fiber also has a problem in that it is difficult to make a unitary construction with the electrodes or with other optical parts, that is, it is difficult to effect an optical integration.

SUMMARY OF THE INVENTION

The object of the present invention is to provide an optical functional device, having an organic nonlinear optical material, as an optical waveguide embedded into the surface of a substrate having a prescribed quality, comprising an organic nonlinear optical material charged into a hollow part which is composed of a channel as an opening provided as a slit on the surface of the above-mentioned substrate and a substrate for covering the upper part of the channel.

In other words, according to the present invention, the aforementioned problems are solved and an optical functional device of a waveguide type comprising an organic nonlinear optical material which can be easily manufactured and also easily subjected to optical integration is provided.

According to the present invention, there can be easily made a unit mode waveguide by capillarity or vacuum aspiration as the device has a space in the form of hollow fine tube. Also the device has a substrate and thus electrodes or other functional parts are readily attached thereto by the use of the substrate.

DESCRIPTION OF THE PREFERENTIAL EMBODIMENTS

The optical functional device according to the present invention will be explained in detail with reference to examples shown in the attached drawings.

Figure 1:
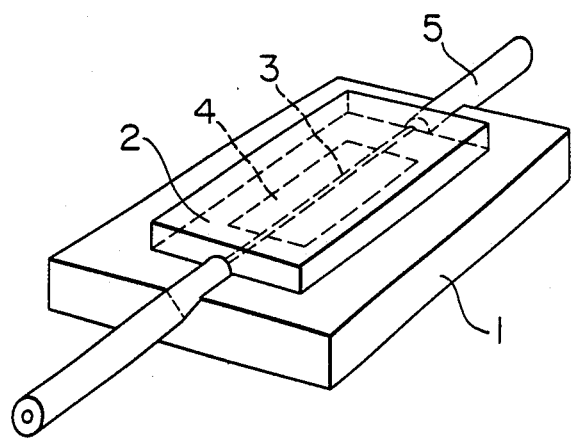
FIG. 1 is a perspective illustration which shows an example of the optical device according to the present invention.

FIG. 1 shows an embodiment of the present invention and which is exemplified in this configuration as a phase modulator which is the most basic embodiment of an optical functional device, in which 1 is a silicon substrate, 2 is a pyrex glass plate, 3 is a waveguide comprising an organic nonlinear optical material, 4 is an electrode and 5 is an optical fiber.

The substrate 1 forms on its surface a channel which is intended to be filled with an organic nonlinear optical material. The channel formed has a prescribed width and depth required for the transmission of a unit mode.

On the surface of the substrate on which the channel has been formed is pasted the glass plate 2 so as to cover the channel, whereby the above-mentioned channel forms a space in the form of a fine tube and an organic nonlinear optical material in the molten state is charged into the space by capillarity or vacuum aspiration, thus forming the waveguide 3 of the organic nonlinear optical material.

In this case, it is necessary for the refractive indices of the surface of the channel of the substrate and the surface of the substrate covering the upper part of the channel to be lower than that of the organic nonlinear optical material as a filler for the purpose of utilizing the substrate as an optical buffer phase in the optical waveguide.

As the substrate there are used a silicon substrate, a glass plate, a plate on which surface glass has been deposited or the like. Refractive indices of the glass plate or the plate on which surface glass has been deposited are lower than that of an organic non-linear optical material. However, the silicon plate usually has a large refractive index and thus it is necessary to subject the surface of the channel or the surface covering the channel to thermal oxidation in order to form an optical buffer layer.

Refractive index (n):
silicon plate (~3.75),
thermally oxidized silicon plate ($SiO_2$) (at the wavelength of 0.6328 μm; n=1.460),
glass plate (pyrex glass plate) (at the wavelength of 0.6328 μm; n=1.472),
organic nonlinear optical material (n=1.5–2.5).

A core part of the optical fiber 5 is connected to the terminals of the waveguide 3. On the substrate 1 there is formed by etching a V-shaped channel extending along the direction of the extension axis of the above-mentioned waveguide 3 so that the optical fiber 5 is provided in the V-shaped channel.

Further on the surface of the substrate there are formed a pair of electrodes 4 between which the waveguide 3 is positioned as is described in detail later. When voltage is applied to the electrodes 4 to generate an electric field in the waveguide 3, the refractive index of the waveguide 3 is varied by the first order electro-optical effect (Pockels effect) to cause a phase modulation of light which passes through the waveguide 3 thus operating as an optical modulator.

Figure 2:
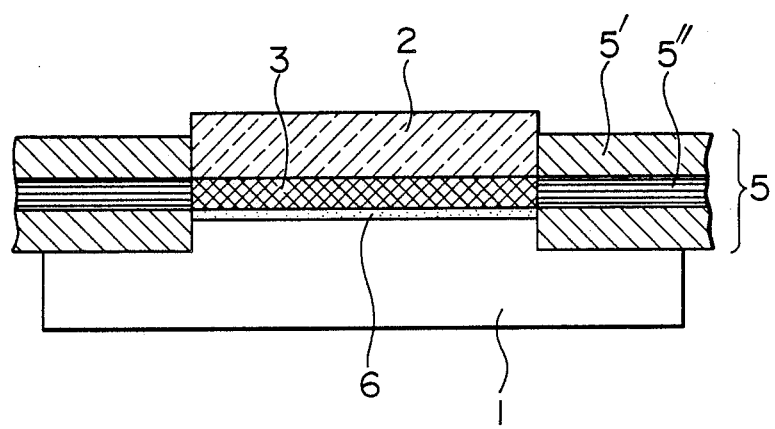
FIG. 2 is a transverse sectional view of the device.
Figure 3:
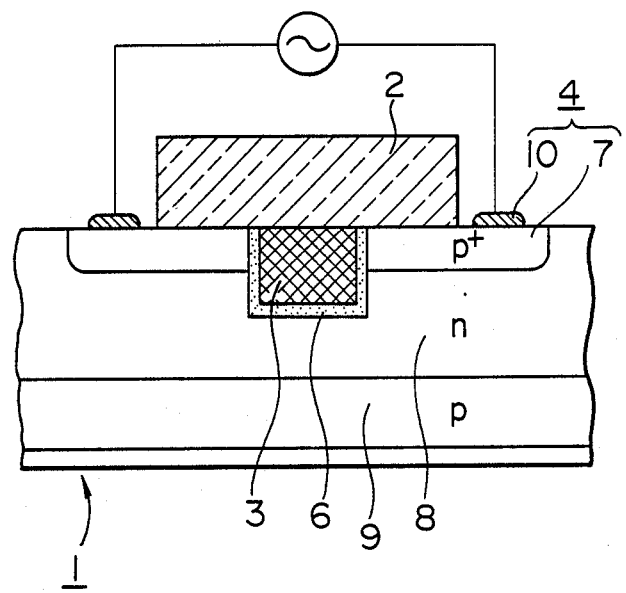
FIG. 3 is a vertical sectional view of the device.

FIG. 2 shows the sectional construction of the device along the waveguide 3, and FIG. 3 shows the sectional construction perpendicular to the waveguide 3.

The silicon substrate 1 is of the p type, and a required electronic circuit or other devices may be preliminarily formed thereon. In this case, for the purpose of insulating the substrate from these attachments, a region 8 of the n type is formed on the substrate 1 having a p type layer 9 and a p= region of which is formed within the region 8 to form a part which will act as the electrode 4, as shown in FIG. 3.

Then, a channel having a width of 1 μm, a depth of 1 μm and a length of 1 mm, that is, a lattice is provided on the face of substrate 1 on which a channel is intended to be formed by reactive sputter-etching. A V-shaped channel for holding an optical fiber is also formed by alkali-etching with the use of potassium hydroxide or the like.

Silicon has a high refractive index, and thus the waveguide 3 cannot be formed directly on the silicon. Accordingly, the surface of the silicon substrate 1 is thermally oxidized to grow the $SiO_2$ layer 6 which will serve as an optical buffer layer. Thermal oxidation is carried out at a temperature of 1,000°–1,200° C. under dry pure oxygen atmosphere (dry oxidation) or under steam atmosphere (steam oxidation). The time required for oxidation depends on the atmospheres, and the steam oxidation will be shorter than the dry oxidation. A $SiO_2$ layer having a refractive index lower than that of silicon is formed by the heat oxidation. It is sufficient that the buffer layer is formed only in the channel which will be a waveguide 3, and thus the $SiO_2$ at the other parts will be removed by etching or the like.

Then, the face on which the channel of the silicon substrate 1 is provided as above is covered with a pyrex glass plate or a substrate material on which surface a pyrex glass is deposited and adhered to the surface with a anodic bonding of a silicon-pyrex glass so that a hollow tube by the above-mentioned channel is formed on the adhering faces. Then, a molten organic nonlinear optical material is charged into the hollow tube by capillarity or vacuum aspiration.

When 2-methyl-4-nitroamine (MNA) is employed as the organic nonlinear optical material, it may be charged at a temperature which is a little higher than 131° C. corresponding to the melting point of MNA but will not cause the decomposition of MNA.

As the organic nonlinear optical material, there may be used m-nitroaniline (m-NA), urea, 3-methyl-4-nitropyridine oxide (POM) and p-nitroaniline (p-NA) as well as MNA.

Then, the organic nonlinear optical material (MNA) thus charged is cooled to room temperature, but it forms a random fine crystal by usual procedures. Accordingly, this material is conveyed at a predetermined slow speed through a furnace having an appropriate temperature gradient to ensure that the material will be recrystallized into a large single crystal and thus may be used as a waveguide.

In FIG. 2, numeral 5' shows the cladding layer of the optical fiber 5 and numeral 5'' shows the core thereof.

Further, on the surface of the n+ layer 7, there is provided an electrode wiring 10 such as aluminum or the like which will be act as a connection.

According to this example, a waveguide 3 having a precise size can be readily formed from an organic nonlinear optical material.

Further, according to the above-mentioned example, a silicon substrate is used as the substrate 1, advantageously offering an additional effect in that a unit mode waveguide with an organic nonlinear optical material and electrodes or other elements can be easily formed on one substrate.

Although the application of the present invention to a phase modulator has been described in the aforementioned example, it is needless to say that such an adhering fashion may be applied also to a modulator such as a branched interference type or a balance bridge type or the like.

It is also possible to provide a heater in place of the electrodes in the above-mentioned example in order to align phase by controlling temperature, so that a higher order harmonic may be generated. In other words, according to this embodiment, there can be obtained an optical frequency converting element.

Figure 4:
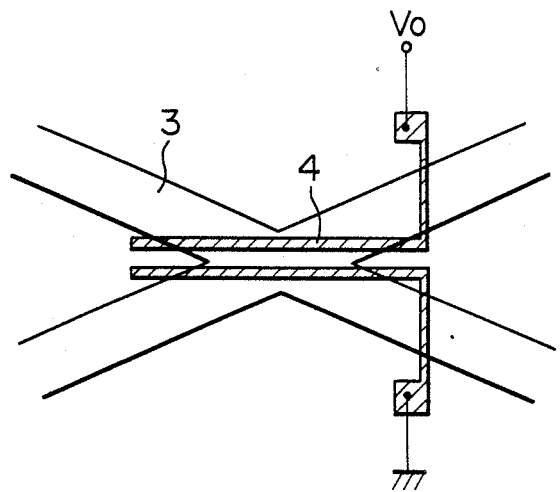
FIGS. 4 and 5 are schematic illustrations which show the sorts of the optical functional devices, respectively.
Figure 5:
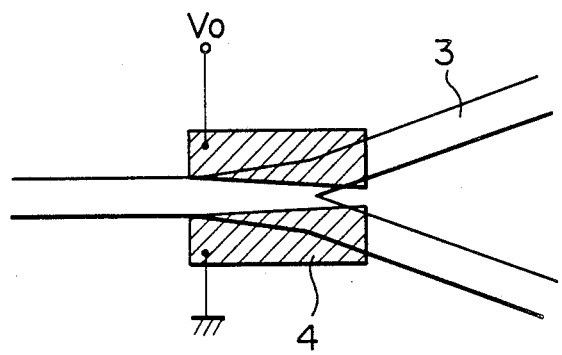

According to the present invention, there can be obtained an internal total reflection switch as shown in FIG. 4 or a branch switch as shown in FIG. 5. However, these devices require overlapping portions between the waveguide and the electrodes and thus it is difficult to realize the present invention by adhering to the construction in the example mentioned above.

Thus, an example suitable for such a case will be described in FIGS. 6 and 7.

Figure 6:
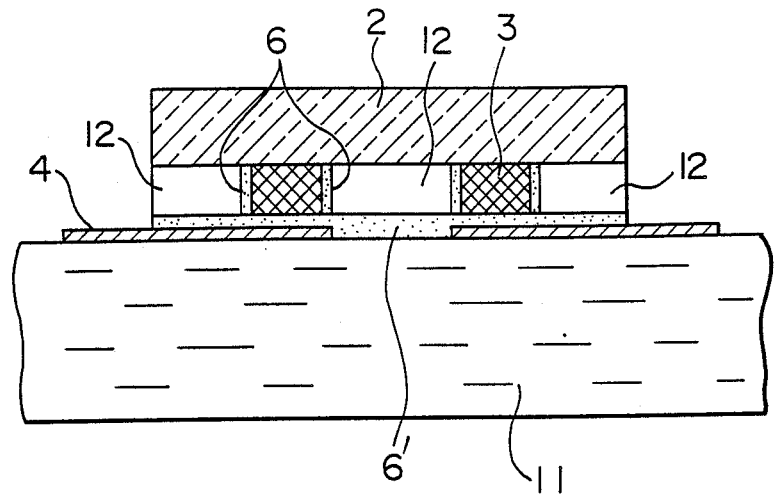
FIGS. 6 and 7 are sectional views, each of which shows another example of the present invention, and FIGS. 8(A–E), 9 and 10, respectively are diagrams which shows further example of the present invention.

First of all, in the example shown in FIG. 6 is used an insulating substrate 11 having an appropriate quality. On the surface of the substrate are formed electrodes 4, on which a $SiO_2$ layer 6 is provided as an optical buffer layer. Then, a silicon layer 12 is deposited to a thickness which corresponds to the depth of the waveguide 3 by chemical vapor deposition (CVD) thus forming the channel for the waveguide. On the internal face of the channel a $SiO_2$ layer 6' as an optical buffer layer is increased by heat oxidation. Then a pyrex glass plate 2 is adhered to the silicon layer by anodic bonding to form a hollow part. Finally, into the hollow part is charged a molten organic nonlinear optical material, which is then solidified and single crystallized to form a waveguide.

Figure 7:
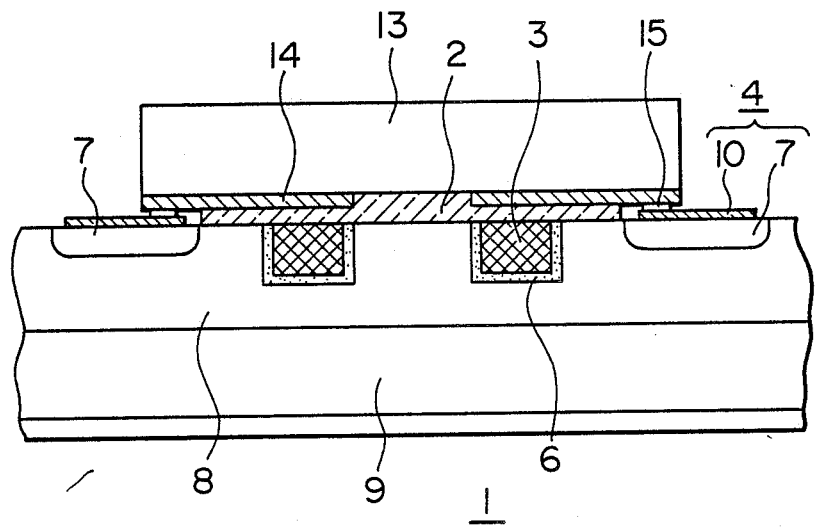

Next, in the example shown in FIG. 7 is used as the substrate 1 a silicon substrate having the p type layer 9, the n region 8 and the p+ region 7 similar to the case of the example shown in FIG. 3. A channel is provided on the substrate to provide a SiO₂ layer 6 and a wiring 10 is also provided. Furthermore, in another appropriate insulating substrate 13 separate from the substrate 1 are disposed electrodes 14 and a pyrex glass layer 2 which is formed by deposition and acts as an adhering layer to an optical buffer layer and the silicon. These two substrates 1 and 13 are laminated to each other by anodic bonding to form a hollow part into which an organic nonlinear optical material is charged to form a waveguide 3.

It is sufficient that the electrode wiring 10 and the electrodes 14 are connected to each other through solder 15.

Therefore, according to the examples shown in FIGS. 6 and 7, the optical waveguide and the electrodes are overlapped to each other. It is also possible to apply the above to the internal total reflection switch shown in FIG. 4 or to the branch switch shown in FIG. 5. The present invention has an effect that integration of a unit mode optical waveguide comprising an organic nonlinear optical material, with electrodes and the other electronic circuit elements can be easily facilitated with respect to the construction of an optical functional device.

While in all of the examples described above a hollow part to be an optical waveguide is formed by laminating and pasting the two substrates, another example of the present invention is described below in which a hollow part is obtained by a series of semiconductor processes but not by such a bonding.

FIG. 8 shows an example of the present invention, in which a series of processes are illustrated in order to prepare a substrate which has a hollow part intended to form an optical waveguide by charging an organic nonlinear optical material. In the first place, a silicon substrate 1 is prepared as shown in FIG. 8A, and electrodes 4 and the other circuit elements required is formed on its surface. Then, a SiO₂ layer 6 is provided thereon, as shown in FIG. 8B, by CVD or heat oxidation, and an opening having a width narrower than that of the required optical waveguide is disposed at a predetermined position.

Next, as shown in FIG. 8C, the silicon substrate 1 is subjected to isotropic etching with a mask of the SiO₂ layer 6 in which an opening is formed. In this case, etching of the substrate 1 proceeds not only to the direction of depth but also to the transverse direction, and thus a channel having a width larger than that of the opening of the SiO₂ layer 6 is formed.

Then, the substrate 1 is subjected to heat oxidation as shown in FIG. 8D to form a SiO₂ layer 6', and thereafter, as shown in FIG. 8E, an SOG (Spin on Glass) which is a material comprising a glass powder and an organic paste and forms a glass-like substance by calcining at 450° C. for 30–60 minutes, the refractive index after calcining: $2 \gtrsim 1.5$ is coated on the surface and calcined at a prescribed temperature of several 100° C. or more to form a SOG layer 16. In this case, the SOG layer 16 can be formed so that it closes the opening but will not enter into the opening. As a result the channel formed by the substrate 1 is covered with the SOG layer 16 thus forming a hollow part.

Accordingly, an optical waveguide can be easily formed by charging an organic nonlinear optical material in the molten state into the hollow part by capillarity or vacuum aspiration.

Figure 9:
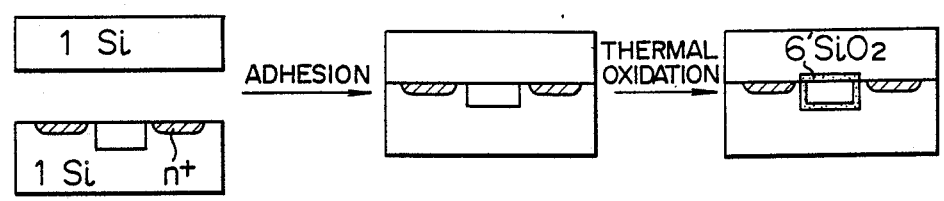

FIG. 9 illustrates another example of the present invention, in which a pair of n+ electrodes are provided on the silicon substrate 1 and a channel which is intended to charge an organic nonlinear optical material for holding an optical fiber is provided on the substrate 1 by etching. The surface of the silicon substrate 1 on which a channel has been provided as above is covered with another silicon substrate 1 and adhered to each other. Strong adhesion is accomplished under a clean condition to prevent from contamination of dust or the like by rinsing thoroughly, activating and adhering the mirror faces of Si wafers. The adhered substrates are calcined at a temperature of 1000° C. or more to be integrated completely. When the laminate of the silicon substrates thus formed is subjected to heat oxidation, the face on which the channel is formed is oxidized to form a SiO₂ layer 6'.

Figure 10:
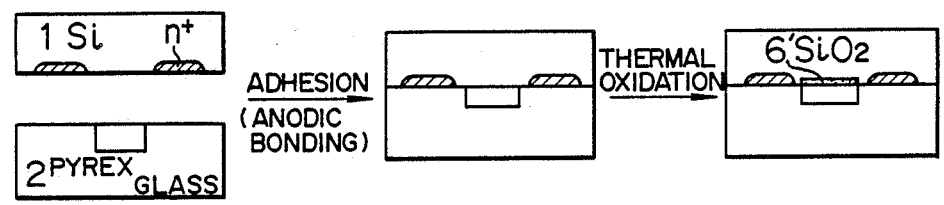

FIG. 10 also illustrates a further example of the present invention, in which a channel is formed by etching on a pyrex glass plate 2 and a pair of n+ electrodes are separately disposed on a silicon substrate 1. The face of the pyrex glass plate on which a channel has been provided is covered with the face of the silicon substrate on which the n+ have been disposed, and these faces are adhered to each other by anodic bonding. After adhesion, heat oxidation is carried out, and the face of the silicon substrate covering the channel is oxidized to form a SiO₂ layer 6'.

EFFECTS OF THE INVENTION

According to the present invention, there can easily be facilitated the charging of an organic nonlinear optical material into a hollow part wherein an optical waveguide comprising an organic nonlinear optical material can be readily formed, so that there can be provided an optical functional device which has a size sufficiently smaller as compared with that of an optical functional device with an optical waveguide comprising a conventional inorganic material, and which may be driven at a low voltage and which has a high speed responsive property.

What is claimed is:

1. In an optical functional device of a unit mode waveguide, wherein the improvement comprises an optical waveguide embedded into a main surface of a first substrate and which includes a channel formed as a slit in the main surface of said first substrate and which slit is of a predetermined length such that it is completely covered by a main surface of a second substrate completely sealing an exposed part of said slit which forms said channel thereby forming a hollow part which is filled with a charge of a nonlinear optical material, wherein there is formed a waveguide for allowing propagation of a unit mode signal.

2. An optical functional device of a unit mode waveguide according to claim 1, wherein the refractive indices along a wall surface of said channel in said first substrate and that part of the main surface of said second substrate covering at least said exposed part of said channel are lower than that of said organic nonlinear optical material in said hollow part.

3. An optical functional device of a unit mode waveguide according to claim 1, wherein said first substrate comprises silicon, said channel having a wall surface which is thermally oxidized and wherein said second substrate covering at least said exposed part of said channel is a glass plate or a substrate on said main surface of which glass has been deposited.

4. An optical functional device of a unit mode waveguide according to claim 1, wherein said first and second substrates are composed of silicon and wherein those portions of said first and second silicon substrates forming a wall surface of said channel are thermally oxidized.

5. An optical functional device of a unit mode waveguide according to claim 1, wherein said first substrate forming thereon said channel comprises a glass plate and said second substrate covering said exposed part of said channel comprises silicon and a portion of said main surface of said second substrate covering said exposed part of said channel being thermally oxidized.

6. An optical functional device of a unit mode waveguide according to claim 1, wherein said second substrate comprises a plate part, and wherein a main surface of said plate part is laminated and bonded with the surface of said first substrate thereby completely sealing said exposed part so as to form said hollow part.

7. An optical functional device of a unit mode waveguide according to claim 1, wherein the main surface of said second substrate is adhered to said main surface of said first substrate thereby completely sealing said exposed part so as to form said hollow part.

8. In an optical functional device of a unit mode waveguide, wherein the improvement comprises an optical waveguide embedded into a main surface of a first substrate and which includes a channel formed as a slit in the main surface of said first substrate and which slit is of a predetermined length such that it is completely covered by a main surface of a second substrate for completely sealing an exposed part of said slit which forms said channel thereby forming a hollow part which is filled with a charge of a nonlinear optical material, said second substrate has an opening at a centrally located portion along said main surface thereof and a length corresponding to said predetermined length so as to overlie said exposed part and includes a substance formed so as to fill said opening and seal said exposed part of said channel, wherein there is formed a waveguide for allowing propagation of a unit mode signal.

9. An optical functional device of a unit mode waveguide according to claim 8, wherein said first substrate forming said channel comprises silicon, said channel having a wall surface which is thermally oxidized and wherein said second substrate which has an opening disposed along said channel length overlying said exposed part of said channel is a thermally oxidized silicon layer and the substance which closes the opening of said second substrate is a glass layer.

10. An optical device of a unit mode waveguide according to claim 9, wherein said channel has a wall surface along the length of the slit which includes a silicon dioxide optical buffer layer for providing said wall surface with an effective refractive index lower than said organic nonlinear optical material in said hollow part.

11. An optical device of a unit mode waveguide according to claim 10, wherein said channel slit has a width larger than the width of the opening of said second substrate.

12. An optical device of a unit mode waveguide according to claim 11, wherein said first substrate is a silicon substrate including regions for use as electrode lead regions.

13. An optical functional device of a unit mode waveguide according to claim 1, wherein said first substrate is a multi-layer silicon substrate which comprises complementary conductivity type regions, and further including electrode lead regions.

14. An optical functional device of a unit mode waveguide according to claim 13, wherein said channel has a wall surface along the length of the slit which includes a silicon dioxide optical buffer layer and at least that part of the main surface of said second substrate covering said channel has a refractive index lower than said organic nonlinear optical material in said hollow part.

15. An optical functional device of a unit mode waveguide according to claim 14, wherein said second substrate is a glass plate.

16. An optical functional device of a unit mode waveguide according to claim 14, wherein said second substrate is a substrate on said main surface of which glass has been deposited.

17. An optical functional device of a unit mode waveguide according to claim 4, wherein said first substrate includes electrode lead regions formed in the main surface thereof.

18. An optical functional device of a unit mode waveguide according to claim 5, wherein said second substrate electrode lead regions formed in the main surface thereof.

19. In an optical functional device of a unit mode optical waveguide wherein the improvement comprises an optical waveguide for transmitting optical information therethrough in the form of a unit mode signal, said waveguide is embedded into a main surface of a semiconductor substrate and wherein it includes a channel formed as a slit in the main surface of said semiconductor substrate and which slit is of a predetermined length such that is completely covered by a main surface of a second substrate completely sealing an exposed part of said slit which forms said channel thereby forming a hollow part which is filled with a charge of a nonlinear optical material, wherein said channel has a wall surface along the length of the slit which includes an optical buffer layer, and wherein said optical buffer layer and said second substrate covering said channel have refractive indices lower than said organic nonlinear optical material in said hollow part.

20. An optical functional device of a unit mode waveguide according to claim 19, wherein said second substrate is a silicon substrate with that part of its main surface covering said channel including an optical buffer layer.

21. An optical functional device of a unit mode waveguide according to claim 20, wherein said channel has a width and depth of about 1 $\mu$m and a length of about 1 mm.

22. An optical functional device of a unit mode waveguide according to claim 19, wherein said channel has a width and depth of about 1 $\mu$m and a length of about 1 mm.

23. An optical functional device of a unit mode waveguide according to claim 15, wherein said channel has a width and depth of about 1 $\mu$m and a length of about 1 mm.

24. An optical functional device of a unit mode waveguide according to claim 2, wherein said channel has a width and depth of about 1 $\mu$m and a length of about 1 mm.

25. An optical functional device of a unit mode waveguide according to claim 1, wherein said channel has a width and depth of about 1 $\mu$m and a length of about 1 mm.

26. An optical functional device of a unit mode waveguide, wherein the improvement comprises an optical waveguide embedded into a main surface of a first substrate and which includes a channel formed as a slit in the main surface of said first substrate and which slit is of a predetermined length such that it is completely covered by a main surface of a second substrate for completely sealing an exposed part of said slit which forms said channel thereby forming a hollow part which is filled with a charge of a nonlinear optical material, one of said first and second substrates being a silicon substrate.

27. An optical functional device of a unit mode waveguide according to claim 26, wherein said channel has a width and depth of about 1 μm.

* * * * *